(12) United States Patent
Pahl et al.

(10) Patent No.: US 7,334,688 B2
(45) Date of Patent: Feb. 26, 2008

(54) FILTRATION SYSTEM AND SEAL ASSEMBLY

(75) Inventors: Brian W. Pahl, Louisville, KY (US); Stephen Haub, New Albany, IN (US)

(73) Assignee: Mann & Hummel GmbH, Ludwigsburg (DE)

( * ) Notice: Subject to any disclaimer, the term of this patent is extended or adjusted under 35 U.S.C. 154(b) by 146 days.

(21) Appl. No.: 11/289,424

(22) Filed: Nov. 30, 2005

(65) Prior Publication Data

US 2006/0131227 A1 Jun. 22, 2006

Related U.S. Application Data

(60) Provisional application No. 60/631,884, filed on Dec. 1, 2004.

(51) Int. Cl.
*B01D 33/04* (2006.01)
*B01D 33/056* (2006.01)

(52) U.S. Cl. .................................................. 210/400
(58) Field of Classification Search ................ 210/400, 210/401
See application file for complete search history.

(56) References Cited

U.S. PATENT DOCUMENTS 3,307,704 A * 3/1967 Pashaian et al. ............ 210/400
3,333,705 A * 8/1967 Lee ............................. 210/251
3,485,379 A * 12/1969 Hutson ........................ 210/400
3,704,787 A * 12/1972 Norton ........................ 210/387
3,706,378 A * 12/1972 Markwick ................... 210/107
4,242,205 A * 12/1980 Hirs ............................. 210/400
4,880,538 A * 11/1989 Barcomb et al. ........... 210/401
5,624,579 A * 4/1997 Bratten ........................ 210/783

FOREIGN PATENT DOCUMENTS

| DE | 38 30 780 A1 | 4/1990 |
| DE | 103 20 532 A1 | 11/2004 |
| FR | 2 787 035 A1 | 6/2000 |
| FR | 2 806 926 A1 | 10/2001 |

OTHER PUBLICATIONS

European Search Report dated Mar. 21, 2006 including English Translation (Seven (7) pages).

* cited by examiner

*Primary Examiner*—Thomas M. Lithgow
(74) *Attorney, Agent, or Firm*—Crowell & Moring LLP

(57) ABSTRACT

A filtration system includes a filter medium that has two side edges. The filter medium is moveable in a longitudinal direction, and at least a segment of the filter medium is used to filter a fluid. Seals are used to seal the filter medium segment's side edges, and the seals are moveable with the filter medium in the longitudinal direction. Consequently, the seal may not need to be raised or deflated during indexing of the filter medium. Additionally, the indexing of the filter medium does not create wear on the filter medium and seal and does not cause distortion or tear of the filter medium.

17 Claims, 4 Drawing Sheets ically used to filter metalworking fluids, such as machining cool-
FILTRATION SYSTEM AND SEAL ASSEMBLY This application claims the benefit of U.S. Provisional Application No. 60/631,884, filed Dec. 1, 2004, the entire disclosure of which is incorporated herein by reference.

FIELD OF THE INVENTION

The present invention relates to a filtration system and a seal assembly.

BACKGROUND OF THE INVENTION

A filtration system having a filter medium belt is typically used to filter metalworking fluids, such as machining coolants, to remove chips and grit so that the fluids can be reused. In such a filtration system, the filter medium belt, disposed in a tank, is moved over a perforated plate support. The fluid to be filtered passes through the filter medium and the perforated plate support under gravity and/or under a pressure generated by a vacuum below the perforated support plate. The filter medium belt is periodically indexed to bring a fresh segment atop the perforated support plate to replace a dirty segment.

The filter medium can be a reusable filter medium, such as a circular, endless filter medium belt, which is indexed periodically as the filter medium becomes dirty, and the dirty segment is then cleaned and reused. Alternatively, the filter medium can be of the disposable type, and the used filter medium is collected for disposal.

The filter medium belt is often driven by a flight conveyor having chain links connected by flights extending across the width of the filter medium belt, which flights may also carry the removed solids out of the tank.

The conveyor can either be attached to the filter medium in the case of a reusable filter medium, or merely frictionally engaged with the filter medium to drive the filter medium often in the case of a disposable filter medium.

A seal is provided to seal each side edge of the filter medium belt to prevent unfiltered fluid from getting under the edge and bypassing the filter medium. One type of seal is in the form of an inflatable tube, which extends along the side edge of the filter medium belt and is inflated with air or liquid during filtering and deflated during indexing to allow the filter medium to move freely without inference from the seal. A second type of seal is a seal that can be lowered during filtering and raised during indexing.

One of the disadvantages associated with these two types of seals is that it is time-consuming to inflate and deflate, or to lower and raise, the seal each time the filter medium is indexed. Another disadvantage is that there is the risk that unfiltered fluid may get under the filter medium edge each time the seal is deflated or raised.

Alternatively, a third type of seal is not deflated or raise when the filter medium is indexed. However, this approach creates wear on the filter medium and seal and may cause distortion or tear of the filter medium.

SUMMARY OF THE INVENTION

In a filtration system according to one aspect of the invention, a seal for sealing a side edge of a filter medium can move with the filter medium, preferably at about the same speed. When the filter medium is indexed, the seal can move together with the filter medium. As a result, unlike the first and second types of prior art seals, the seal of the present invention does not need to be raised or deflated. And, unlike in the third type of prior art seal, the indexing of the filter medium does not create wear on the filter medium and seal and does not cause distortion or tear of the filter medium. Therefore, the problems associated with prior art filtration systems can be overcome.

In a preferred embodiment of the present invention, the seal is made from a compressible material so that the seal conforms to different filter medium thickness and to imperfections on the filter medium surface and on the filter medium support. A compressible seal also makes it easier for the seal to go around a sprocket used to drive the seal.

The filtration system of the present invention may also include a tank for receiving a metalworking fluid. The seal preferably is an endless seal that can move along a track inside the tank, although the filter medium may be a disposable filter medium belt that is used only once. The seal preferably includes a portion that is adjacent to the cover of the tank so that the seal can be accessed for inspection or replacement by simply opening the cover. This can result in a significant reduction in downtime and maintenance costs. In the prior art, on the other hand, the fluid in the tank must be drained before the seal can be inspected or replaced.

The seal may be part of a seal assembly that includes also a chain, to which the seal is attached. The chain preferably includes a plurality of links, each of which includes a bracket extending in a direction perpendicular to a longitudinal direction of the chain. The seal can be attached to the brackets.

In accordance with another aspect of the invention, the filtration system includes a rail for guiding a segment of the seal assembly in the area where the filter medium is supported by the filter medium support and used to filter a metalworking fluid. The rail can be used to press the seal to ensure that the seal presses the side edge of the filter medium firmly against the filter medium support to seal the side edge of the filter medium. The rail may have a sealed interior, and the chain of the filter medium assembly may be disposed in the sealed interior to ensure that chips and grit in the metalworking fluid cannot get inside the rail to interfere with the movement of the chain.

In accordance with a further aspect of the invention, the seal preferably includes a V-shaped cut between two adjacent brackets of the seal chain. The V-shaped cuts allow the seal to bend easily when it goes around a sprocket used to drive the seal chain.

DETAILED DESCRIPTION OF PREFERRED EMBODIMENTS

Figure 1:
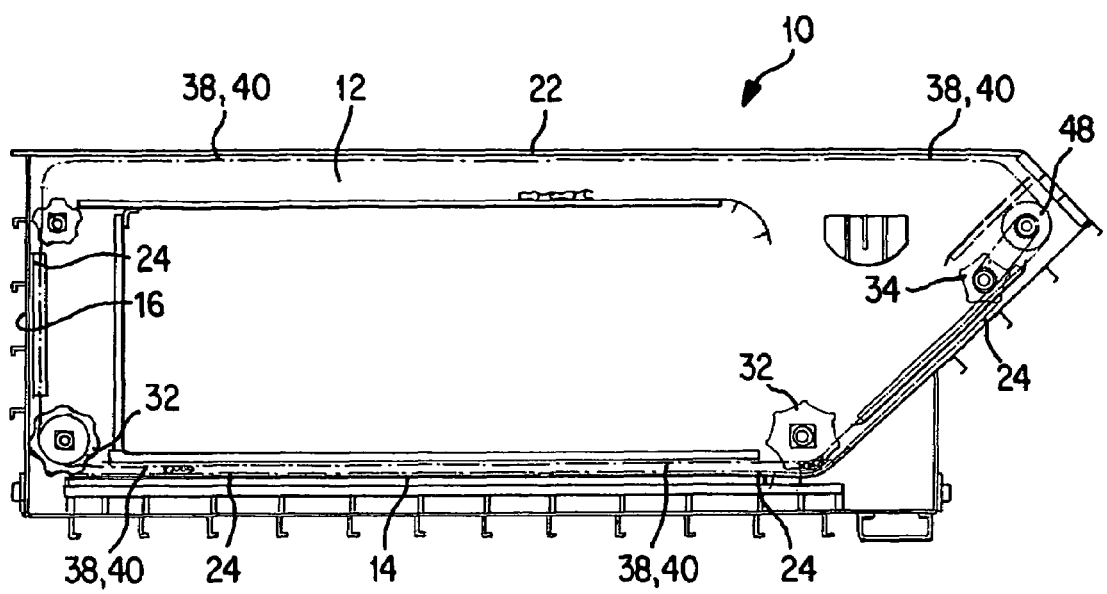
FIG. 1 is a cross section side view of a preferred filtration system of the present invention.
Figure 2:
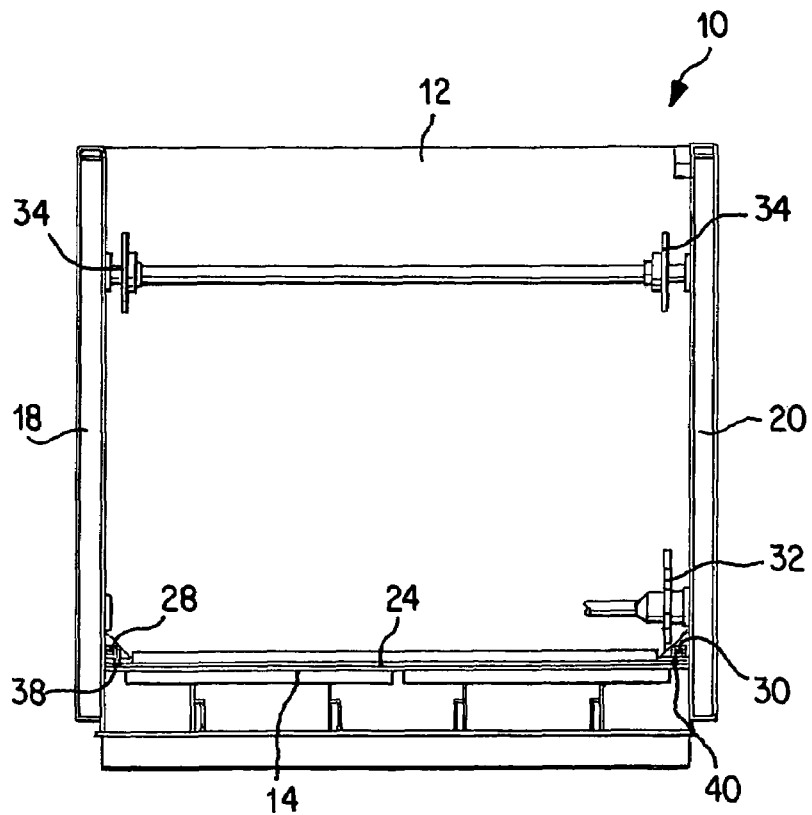
FIG. 2 is a cross section end view of the filtration system shown in FIG. 1.

FIGS. 1 and 2 illustrate a preferred filtration system 10 of the present invention. This filtration system 10 includes a tank 12 that has a ramp 13, a bottom plate (or base) 14, a back wall 16, two sidewalls 18, 20, and a cover 22. The tank 12 is used to receive a metalworking fluid. The filtration system 10 includes also a filter medium 24 for removing chips and grit from the metalworking fluid, and the bottom plate 14 of the tank 12 may be porous and may be used as a support for the filter medium 24.

In the illustrated embodiment the filter medium 24 preferably is a circular, endless filter medium belt that is reusable, although a disposal filter medium that is used only once can also be used. A portion of the endless filter medium belt 24 may be arranged in the tank 12 between the sidewalls 18, 20 and atop the porous bottom plate 14. This portion of the filter medium belt 24 can move along its longitudinal direction so that it can be periodically indexed to bring a fresh segment atop the support plate 14 to replace a dirty segment. Although not shown in the drawings, another portion of the endless filter medium belt may be placed outside the tank 12. For example, the filter medium belt 24 may extend to the outside of the tank 12 at the top of the back wall 16, then proceed downwards along the back wall 16 and laterally underneath the tank 12 in the direction from the back wall 16 to the ramp 13, and finally return inside the tank 12 at the ramp 13. While the filter medium belt 24 is outside the tank, it may be scraped, brushed and/or washed, to remove chips and grit.

Figure 3:
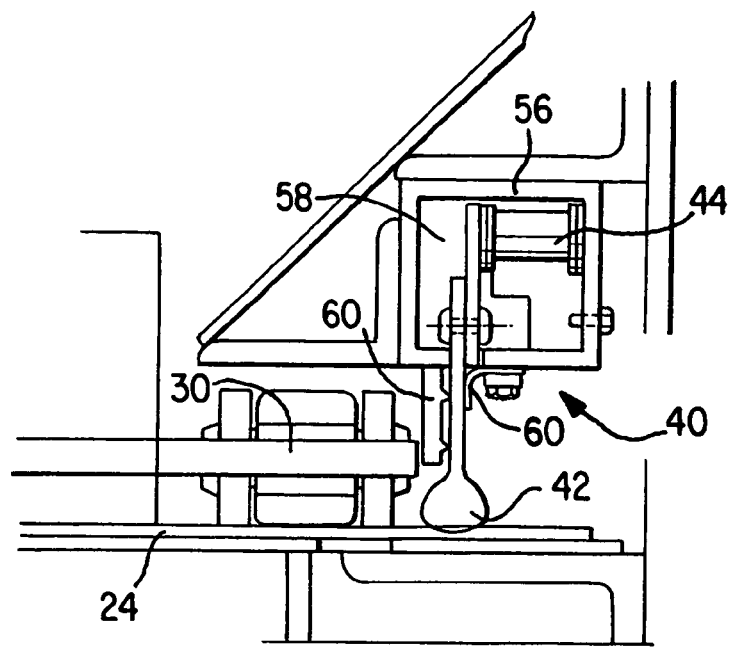
FIG. 3 is a cross section view of a conveyor chain, a seal assembly, and a guide rail of the filtration system of FIG. 1.

The movement of the filter medium 24 preferably is driven by a chain conveyor, as shown in FIGS. 1 and 3. The chain conveyor has two chains 28, 30 arranged near the respective side edges of the filter medium 24 along the sidewalls 18, 20 of the tank 12. One of the conveyor's chains 28, 30 is shown in FIG. 3.

The chains 28, 30 of the conveyor are driven and guided by a set of sprockets 32, 34 as shown in FIGS. 1, 2 and 3. The sprockets 32, 34 can be arranged in pairs as shown in FIG. 1. One sprocket 32 of a pair is arranged on one side of the ramp 13, and the other sprocket 32 on the other side of the ramp 13. The conveyor chains 28, 30 may be driven by a motor, such as an electric motor, or by a gear reducer.

As shown in FIGS. 1, 2 and 3, the filtration system 10 also includes two seal assemblies 38, 40 that are arranged along the respective side edges of the filter medium 24. The two seal assemblies 38, 40 are used to seal the respective side edges of the filter medium 24 to prevent unfiltered metalworking fluid from bypassing the filter medium 24. The seals 42 of the seal assemblies 38, 40 compress the respective side edges of the filter medium 24 against the filter support 14 to seal the side edges of the filter medium 24.

The seal assemblies 38, 40 are moveable with the filter medium 24. The seal assemblies 38, 40 each include a chain 44, and the chains 44 of the seal assemblies 38, 40 are driven and guided by another set of sprockets 48. These sprockets 48 may also be arranged in pairs. One sprocket 48 of a pair may be arranged on one sidewall 18 of the tank 12, and the other sprocket 48 on the other sidewall 20. The two sprockets 48 of each pair may be connected with a shaft so that they rotate together to ensure that the two seal assemblies 38, 40 move synchronously. One pair of the sprockets 48 may be driven by a motor, such as an electric motor, to drive the seal assemblies 38, 40.

Figure 4:
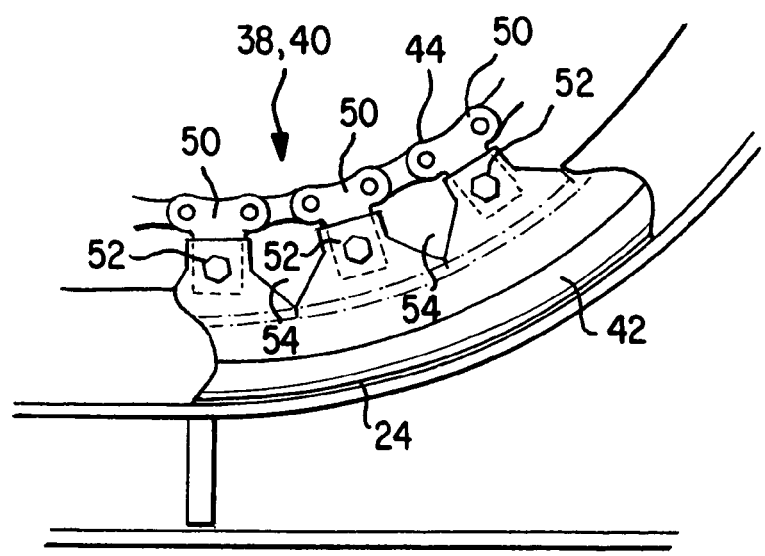
FIG. 4 is a side view of the seal assembly of the filtration system of FIG. 1.

The chain 44 of each seal assembly 38, 40 includes a plurality of links 50, and each link 50 has a bracket 52 that extends from a side of the link 50 in a direction perpendicular to the longitudinal direction of the chain 44. The seal 42 is attached to the brackets 52 of the chain links 50 to form a seal assembly. As shown in FIG. 4, the seal 42, preferably made from a compressible material, includes a V-shaped cut 54 between two adjacent brackets 52. The V-shaped cuts 54 allow the seal 42 to bend easily when it goes around a sprocket.

Each seal assembly 38, 40 may be an endless seal assembly, as shown in FIG. 1. Each seal assembly 38, 40 runs along the base 14, back wall 16, and cover 22 of the tank 12, and is supported in the tank by rails, sprockets and/or tracks. It is a significant advantage that a portion of each seal assembly 38, 40 is arranged adjacent to the cover 22, so that the seal assembly 38, 40 is accessible for inspection or replacement, simply by opening the cover 22. As stated above, this can result in a significant reduction in downtime and maintenance costs.

To ensure that each seal assembly 38, 40 is properly positioned so that the seal 42 compresses the side edge of the filter medium 24 to provide a secure seal, a guide rail 56 for the seal assembly 38, 40 is provided in the area where the filter medium 24 is used to filter metalworking fluid. The guide rail 56 has the necessary structure to ensure that the seal assembly 38, 40 is positioned substantially perpendicular to the filter medium, and the vertical position of the guide rail 56 is selected so that the guide rail 56 compresses the seal assembly 38, 40 against the filter medium 24 and filter support 14 to provide a secure seal.

As shown in FIG. 3, each guide rail 56 has a sealed interior 58 in which the chain 44 of the seal assembly 38, 40 is disposed. The seal 42 of the seal assembly 38, 40, on the other hand, extends to the exterior of the guide rail 56. The guide rail 56 has seals 60 that prevent chips and grit in the unfiltered metalworking fluid from getting into the sealed interior 58 of the guide rail 56 to interfere with the movement of the seal assembly 38, 40.

Figure 5:
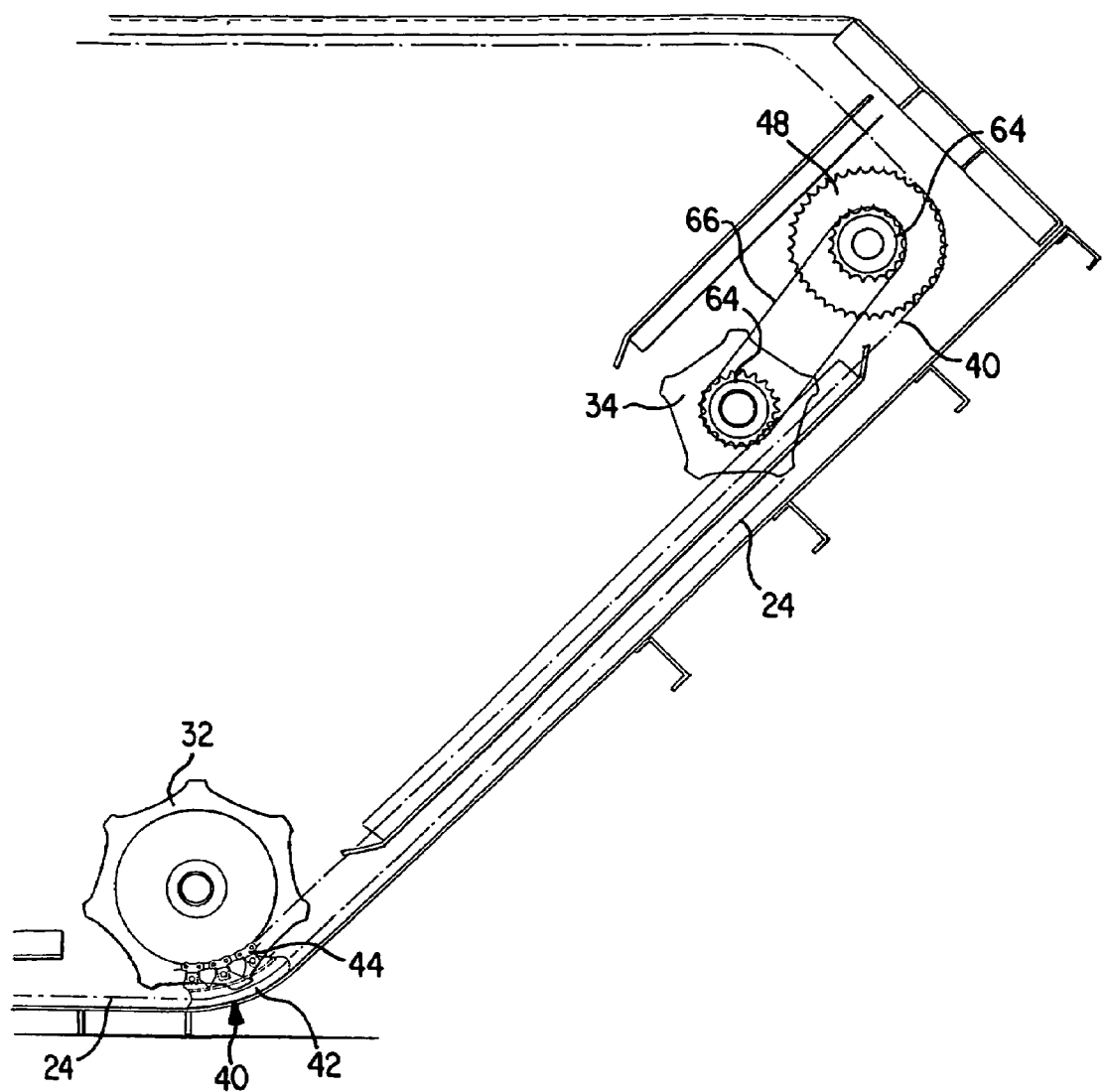
FIG. 5 shows two sprockets of the filtration system of FIG. 1.

In order for the chain conveyor 26 (and thus the filter medium 24) and the seal assemblies 38, 40 to move substantially at the same speed, the sprockets 34 of the chain conveyor 26 are preferably synchronized with the sprockets 48 of the seal assemblies 38, 40. One way to accomplish that is shown in FIG. 5. In the embodiment shown in FIG. 5, a sprocket 34 of the chain conveyor 26 has substantially the same pitch diameter as a sprocket 48 of the seal assemblies 38, 40. In the embodiment shown in FIG. 5, the mechanism is a sprocket-chain arrangement that includes two sprockets 64 that are rotationally fixed to the two sprockets 34, 48, respectively, and a chain 66 connecting the two sprockets 64. This sprocket-chain arrangement ensures that the two sprockets 34, 48 rotate at the same speed. Since the two sprockets 34 48 have the same diameter and rotate at the same speed, the conveyor chain 28, 30 and the seal assemblies 38, 40 move at the same speed. Alternatively, any other suitable arrangement, such as a gear set, may be used to ensure that the conveyor chain 28, 30 and the seal assemblies 38, 40 move at the same speed. Furthermore, because the two sprockets 34, 48 are rotationally connected, a single motor may be used to drive both the seal assemblies 38, 40 and the chain conveyor 26.

In general, however, the filter medium 24 and the seal assemblies 38, 40 do not need to move at exactly the same speed as long as the speed difference does not create significant wear on the filter medium 24 and seal 42 or significant distortion or tear of the filter medium 24. The tolerable speed difference depends on the materials used to make the filter medium 24 and seal 42. Given the selected filter medium and seal materials, a person with ordinary skill in the art can determine the tolerable speed difference by conducting routine durability tests.

The seal assemblies 38, 40 are moveable with the filter medium 24. The seal assemblies 38, 40 each include a chain 44, and the chains 44 of the seal assemblies 38, 40 are driven and guided by another set of sprockets 48. These sprockets 48 may also be arranged in pairs. One sprocket 48 of a pair may be arranged on one sidewall 18 of the tank 12, and the other sprocket 48 on the other sidewall 20. The two sprockets 48 of each pair may be connected with a shaft so that they rotate together to ensure that the two seal assemblies 38, 40 move synchronously. One pair of the sprockets 48 may be driven by a motor, such as an electric motor, to drive the seal assemblies 38, 40.

Figure 6:
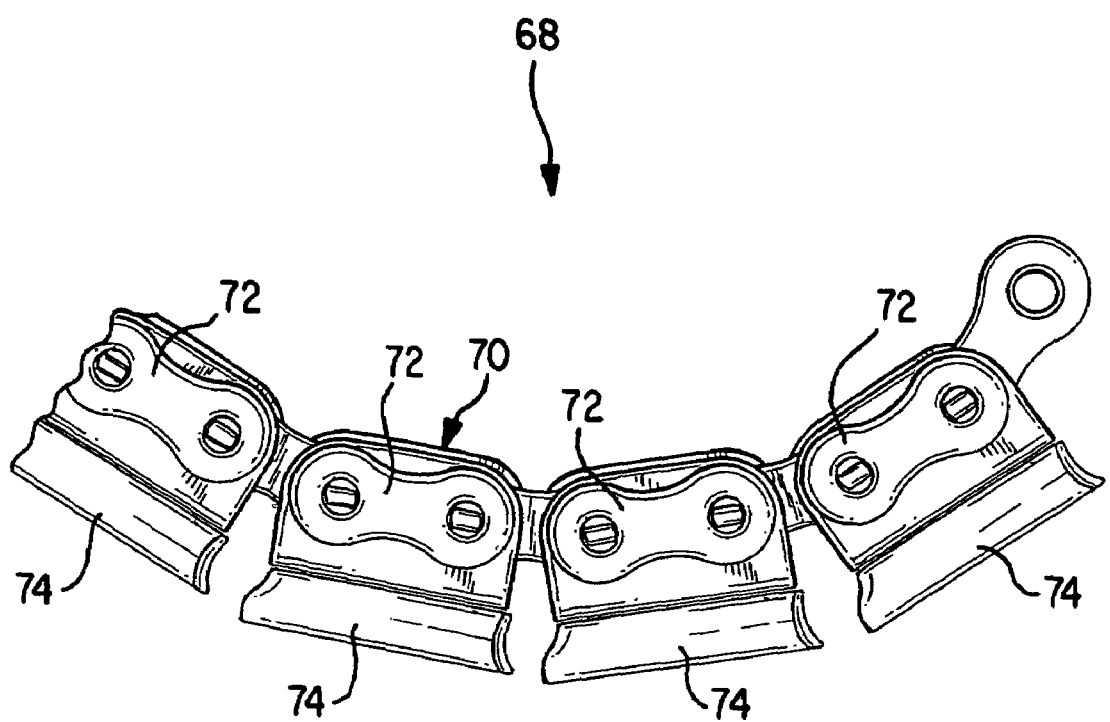
FIG. 6 is a side view of another seal assembly of the filtration system of FIG. 1.

FIG. 6 illustrates another seal assembly 68 of the present invention. This seal assembly 68 includes a seal and a chain 70 that has a plurality of chain links 72. The seal includes a plurality of seal segments 74, and each chain link 72 is attached to a seal segment 74. Preferably, each seal segment 74 is molded onto the corresponding chain link 72, although it may also be attached to the chain link 72 using any other suitable method, such as by the use of glue.

Preferably, each seal segment 74 is longer than the corresponding chain link 72 so that, when a portion of the seal assembly 68 forms a straight line, each end of each seal segment 74 in that portion is sealingly pressed against an adjacent seal segment 74 to form a continuous seal and to prevent unfiltered fluid from leaking through the gap between the seal segments 74. Since the portion of the seal assembly 68, which is used to compress the filter medium 24 against the filter support 14, forms a straight line, this portion forms a continuous seal to seal a side edge of the filter medium 24 against the filter support 14.

The seal assembly 68 shown in FIG. 6 has various advantages. For example, when a seal segment is damaged or worn out, only this seal segment (not the entire seal assembly) needs to be replaced. Additionally, this seal assembly 68 can bend more easily, making it easier to handle and store the seal assembly 68.

The invention claimed is:

1. A filtration system comprising:
a filter medium that has two side edges and is moveable in a longitudinal direction, wherein at least a segment of the filter medium is used to filter a fluid; and
a seal assembly that is designed to seal one of the filter medium segment's side edges, wherein the seal assembly is moveable with the filter medium in the longitudinal direction;
wherein said seal assembly comprises a chain formed from a plurality of links and a seal formed from a plurality of seal segments, and
wherein each link is attached to one of the seal segments, and each seal segment is molded onto the attached link.

2. The filtration system of claim 1, further comprising a second seal that is designed to seal the other side edge of the filter medium and is moveable with the filter media in the longitudinal direction.

3. The filtration system of claim 1, wherein the seal is moveable at about the same speed as the filter medium.

4. The filtration system of claim 1, wherein the seal includes a compressible material.

5. The filtration system of claim 1, wherein the filter medium has the configuration of a belt.

6. The filtration system of claim 5, further comprising a track, wherein the seal is an endless seal moveable along the track.

7. The filtration system of claim 6, further comprising a tank having a cover, wherein the seal is disposed in the tank, and wherein the track includes a portion that is adjacent to the cover so that the seal is accessible for inspection or replacement by opening the cover.

8. The filtration system of claim 1, wherein each seal segment is longer than the corresponding link.

9. The filtration system of claim 1, wherein each of the chain links includes a bracket extending in a direction perpendicular to a longitudinal direction of the chain, and wherein the seal is attached to the brackets.

10. The filtration system of claim 9, wherein the seal includes a V-shaped cut between two adjacent brackets.

11. The filtration system of claim 1, further comprising a sprocket, wherein the sprocket is engaged with the chain of the seal assembly to drive the seal assembly.

12. The filtration system of claim 1, further comprising a filter medium support on which the filter medium segment is supported, wherein the seal presses the one side edge of the filter medium segment against the filter support to seal the one side edge of the filter medium segment.

13. The filtration system of claim 12, further comprising:
a seal assembly that includes the seal, wherein the seal assembly includes a chain to which the seal is attached; and
a rail for guiding a segment of the chain that corresponds to the filter medium segment, wherein the rail presses the seal assembly to ensure that the seal presses the one side edge of the filter medium segment against the filter support to seal the one side edge of the filter medium segment.

14. The filtration system of claim 13, wherein the rail has a sealed interior, and wherein the chain segment is disposed in the sealed interior.

15. A filtration system comprising:
a filter medium that has two side edges;
a seal assembly that includes a chain constructed of a plurality of chain links and a seal attached to the chain, wherein the seal is constructed of a plurality of seal segments each molded onto a corresponding link of the chain, and the seal is designed to seal one of the filter medium segment's side edges; and
a rail for guiding the chain, wherein the rail has a sealed interior, and wherein the chain is disposed in the sealed interior.

16. The filtration system of claim 15, further comprising:
a second seal assembly that includes a chain and a seal that is attached to the chain of the second seal assembly, wherein the seal of the second seal assembly is designed to seal the other side edge of the filter medium; and
a second rail for guiding the chain of the second seal assembly, where the second rail has a sealed interior, and wherein the chain of the second seal assembly is disposed in the sealed interior of the second rail.

17. The filtration system of claim 15, wherein each seal segment is longer than the corresponding link.

* * * * *